US005330346A

United States Patent [19]

Scardovi

[11] Patent Number: 5,330,346

[45] Date of Patent: Jul. 19, 1994

[54] DIE FOR CERAMIC TILES

[75] Inventor: Italo Scardovi, Faenza, Italy

[73] Assignee: Sichenia Gruppo Ceramische S.p.A., Sassuolo, Italy

[21] Appl. No.: 12,024

[22] Filed: Feb. 1, 1993

[30] Foreign Application Priority Data

Feb. 13, 1992 [IT] Italy ........................... M092A000018

[51] Int. Cl.$^5$ ........................................... B29C 43/00

[52] U.S. Cl. ................................ 425/405.1; 249/82; 264/313; 425/406; 425/DIG. 44

[58] Field of Search ................. 249/82; 264/313, 314; 425/389, 405.1, 405.2, 406, 408, DIG. 44

[56] References Cited

U.S. PATENT DOCUMENTS

| | | | |
|---|---|---|---|
| 3,593,380 | 7/1971 | Voronov et al. | 425/389 |
| 4,043,724 | 8/1977 | Schubart | 425/218 |
| 4,156,589 | 5/1979 | Schmitt et al. | 425/389 |
| 4,158,691 | 6/1979 | Schubart | 264/314 |
| 4,447,201 | 5/1984 | Knudsen | 425/389 |

FOREIGN PATENT DOCUMENTS

| | | |
|---|---|---|
| 958393 | 3/1950 | France . |
| 1104511 | 11/1985 | Italy . |
| 196996 | 12/1985 | Italy . |
| 203289 | 12/1986 | Italy . |
| 1158781 | 2/1987 | Italy . |
| 212838 | 9/1989 | Italy . |
| 214739 | 6/1990 | Italy . |

*Primary Examiner*—Charles S. Bushey

*Attorney, Agent, or Firm*—Darby & Darby

[57] ABSTRACT

The invention relates to a die for ceramic tiles. The die includes two semi-dies between which the material to be compacted is pressed. One of the half-dies is connected to an elastic wall. An external face of the elastic wall has the imprint of one of the faces of the tile to be manufactured. The elastic wall is positioned over and in contact with a cavity that is filled with an incompressible liquid. The cavity is divided into portions by a lattice.

4 Claims, 1 Drawing Sheet

DIE FOR CERAMIC TILES

BACKGROUND OF THE INVENTION

The invention relates to a die for ceramic tiles. For the production of ceramic tiles a process which has been in use for some time is one that substantially consists in the pressing of the powders between two half-dies, with the aim of obtaining the compression of the powders and the formation of the tile which will be of a shape determined by the form of the empty space created between the two half-dies when the die is completely closed.

Once the operation has been finished, the tile is sent to be fired, which completes the process. Sometimes, during the firing, some differentiated shrinkage of the tile occurs, leading to a deformation of the tile itself; the tile, according to the entity of the shrinking, is thus considered to be no longer of first quality but of faulty quality, or even waste.

The differentiated shrinking of the parts of the tile is determined by the different density of the parts which are created during the compressing process, The causes which determine the different density (or rather the non-homogeneity) of the parts of the tile are firstly the non-homogeneity of the powders and, principally, the non-uniform distribution of the powders in the die. If, in a zone of the die, there is a larger quantity of powder, or a powder of higher density with respect to the remaining powder, the tile in that zone will be, after the compressing process, denser with respect to the other parts of the tile and will have a smaller shrinkage if the piece is taken to be fired up to gresification, or it will be less porous in the case in which the piece itself, without shrinkage, remains porous after firing.

To obviate this drawback dies with elastic membranes tensed by underlying pressurised fluid have been used, which technique is well established in the prior art and used for other ceramic products such as plates, insulating elements and the like. The above dies have not, however, up to now, given good results in that the piece that comes out of the dies is deformed by cavities and concavities, which can be acceptable for products already shaped but which is not acceptable for tiles which must have flat laying surfaces both for the subsequent firing and for the laying.

An aim of the present invention is thus that of eliminating the above-mentioned drawbacks by providing a die which permits of obtaining a tile having equal overall density, even in the case where there is non-homogeneity in the powders used or non-uniform distribution of the powders themselves in the die and which enables the tile laying surfaces to be kept flat.

An advantage of the present invention is that of providing à die which is constructionally cheap and usable with normal presses of the types already in use.

SUMMARY OF THE INVENTION

These aims and advantages and others besides are all attained by the present invention, which comprises two semi-dies, between which the material is compressed, at least one of which dies, exhibits an elastic wall, on which wall external face the imprint of one of the faces to be realized is inscribed, which overlies a cavity filled with an incompressible fluid, divided into portions by a lattice.

BRIEF DESCRIPTION OF THE DRAWINGS

Further characteristics and advantages of the present invention will better emerge from the detailed description that follows, of an embodiment of the invention, herein illustrated purely in the form of a non-limiting example in the accompanying figures, in which.

DESCRIPTION OF THE PREFERRED EMBODIMENTS

Figure 2:
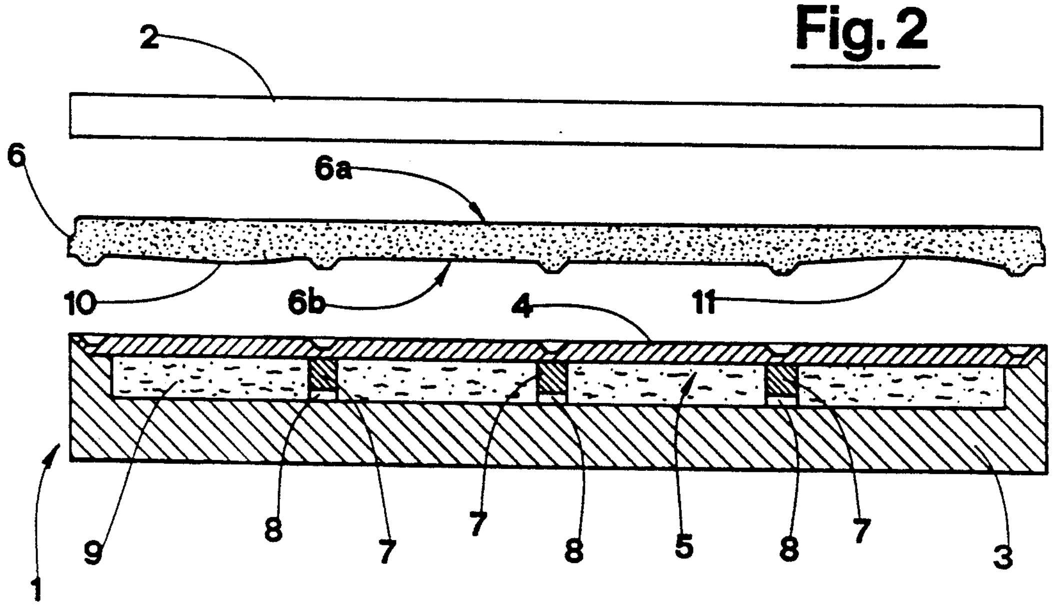
FIG. 2 shows a section, made according to plane II—II of FIG. 1, of the semi-die of FIG. 1, superiorly to which fine sections of a tile and of the second semi-die are illustrated.
Figure 1:
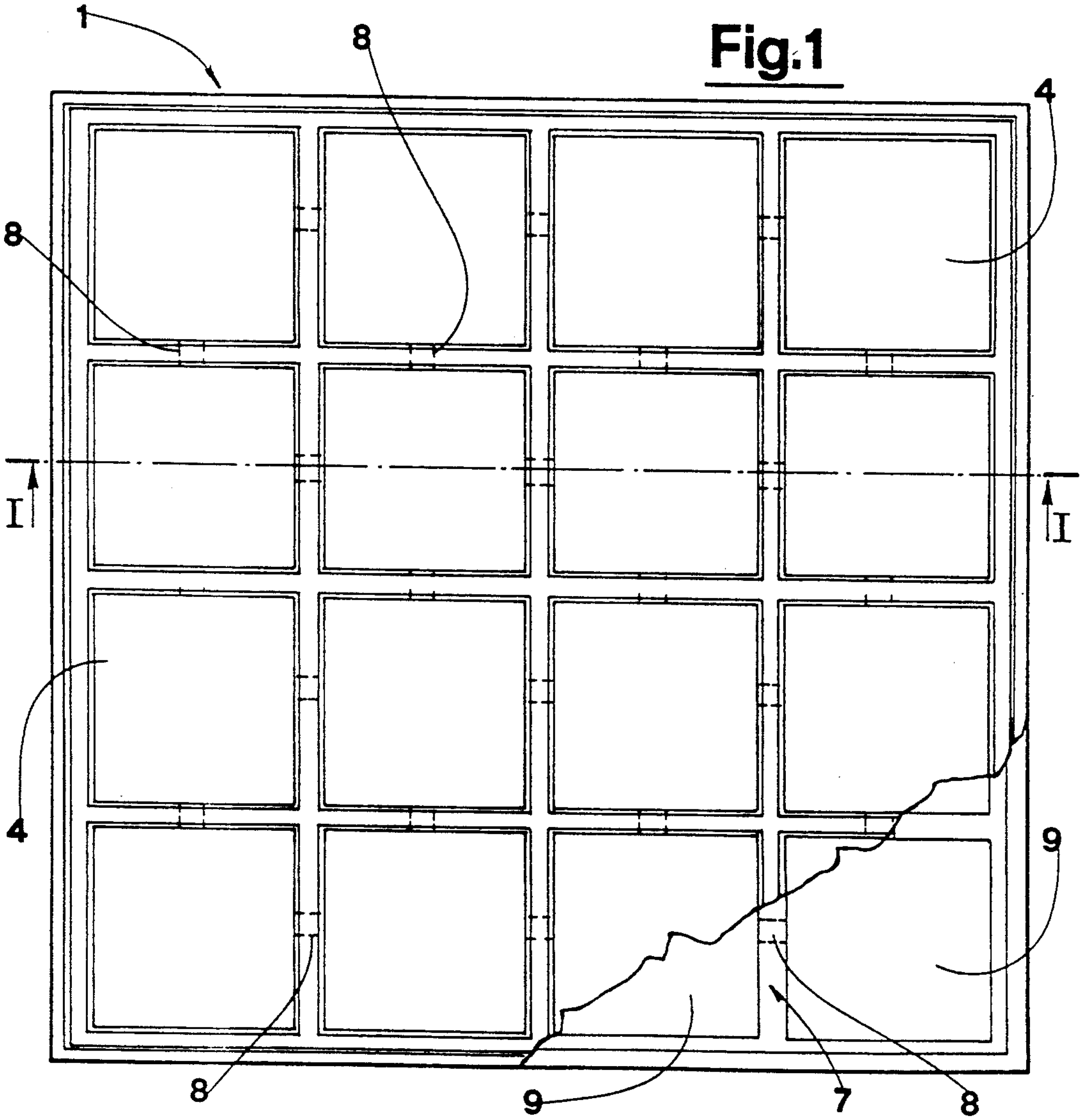
FIG. 1 shows a view from above of one of the semi-dies of the die object of the invention.

The die comprises two half-dies 1 and 2 between which the material to be compressed is pressed; the half-die 2 has a flat surface and reproduces the smooth face 6*a* of the tile 6, while the half-die 1 has a shaped surface that reproduces the inferior part 6*b* of the tile itself. As in the present applications., the two half-dies 1 and 2 are contained in a lateral frame, not illustrated, and can be reciprocally approached and distanced. The half-die 1, destined to reproduce the inferior surface 6*b* of the tile 6, comprises a concave, rigid base 3 which defines a cavity 5 superiorly closed by an elastic wall 4 which is solidly anchored to the edges of the rigid base 3 and completely insulates the cavity 5 from the external space.

The elastic wall 4 can be made with natural or synthetic elastomers. On its external surface the imprint of the inferior part of the tile is inscribed.

In the embodiment shown in the figure, the inferior part of the tile is equipped with a continuous lattice, for which reason the imprints on the elastic wall 4 are also continuous: obviously nothing technical changes in cases where the inferior surface of the tile must be inscribed with discrete points.

Internally to the cavity 5 a lattice 7 is made, on which the elastic wall 4 rests, which elastic wall 4 divides the said cavity 5 into a plurality of portions or channels 9.

The elastic wall 4 is solidly anchored to a supporting surface of the lattice; the imprint made on the elastic wall is arranged by means of the lattice.

In the various tracts that form the lattice 7 through-holes 8 are envisaged which place all of the portions 9 in connection or fluid communication among themselves. The cavity 5 is full of an incompressible fluid which can be, for example, water, oil or other liquids.

For the realization of the tile a prefixed quantity of powder, destined to be pressed in the die, is distributed on the lower half-die 2 which, as has been previously mentioned, is laterally defined by a lateral containing frame, in the most uniform way possible, It should be mentioned that the lower die can be equally half-die 1, as in the figures, or half-die 2.

The half-dies 1 and 2 are thus reciprocally closed in such a way as to press the powder and cause its compression.

Contrary to what happens in the case of dies of known type, in which the pressure exerted in the areas with a greater quantity of powder is greater (and thus the density is higher in the tile in these areas), the die object of the invention exerts the same pressure on all the parts of the tile. This is due to the presence of fluid in the cavity 5 and to the elastic nature of the elastic wall 4 closing the cavity 5 and acting directly on the powders to be compressed.

In the areas having a larger quantity of powder there will be a slight increase in the thickness of the tile, with the consequent formation of small convexities 10, while in the areas with a smaller quantity of powder there will be a slight diminution of the thickness of the tile with a consequent formation of a small concavity 11. All this does not lead to any drawback, since these small deformations are arranged on the already-shaped inferior surface of the tile and are contained within the space defined by the inferior surface of the tile-lattice itself. The presence of the lattice 7 ensures the always-perfect coplanarity of the tile inferior lattice, even for tiles of considerable size.

The important fact is that all of the areas of the tile are subjected to the same pressure and thus have the same density.

An exception to this is the surface occupied by the lattice, where the die behaves like a traditional rigid die. This surface represents however a very limited percentage of the total surface of the tile; further, the width of the lattice tracts is very limited, for which reason, in these areas, the overlying powders distribute, in the moment in which they receive the compression, with a motion which is at least partially fluid-type.

In the subsequent firing phase, this characteristic will lead to the avoidance of deformations in the tile if the tile is sent to be fired up until gresification, or, in the case in which it does not reach the gresification stage, the forming of too-differentiated porous areas. The lattice of the tile is however always flat and permits a perfect resting of the tile both during the firing phase and during the laying phase.

What is claimed:

1. A die for ceramic tiles: a first half die and a second half die, at least one of said half dies comprises a rigid, concave base to define a cavity, an incompressible fluid being disposed in said cavity, said cavity being closed by an elastic wall, said elastic wall having an external face on which an imprint of a face of a tile to be realized is inscribed, a lattice being disposed within the cavity, said lattice dividing said cavity into a plurality of chambers, said lattice defines a supporting surface for said elastic wall said elastic wall being fixedly connected to said supporting surface, said imprint being made at a position corresponding to a position of said lattice.

2. A die as in claim 1, wherein a plurality of through-holes are bored into said lattice, said through-holes place all of said chambers in fluid communication with one another.

3. A die as in claim 2, wherein said lattice is comprised of a plurality of tracts, said through holes being bored into said plurality of tracts.

4. A die as in claim 1, further comprising a material to be compacted being disposed between said first half die and said second half die.

* * * * *